UNITED STATES PATENT OFFICE.

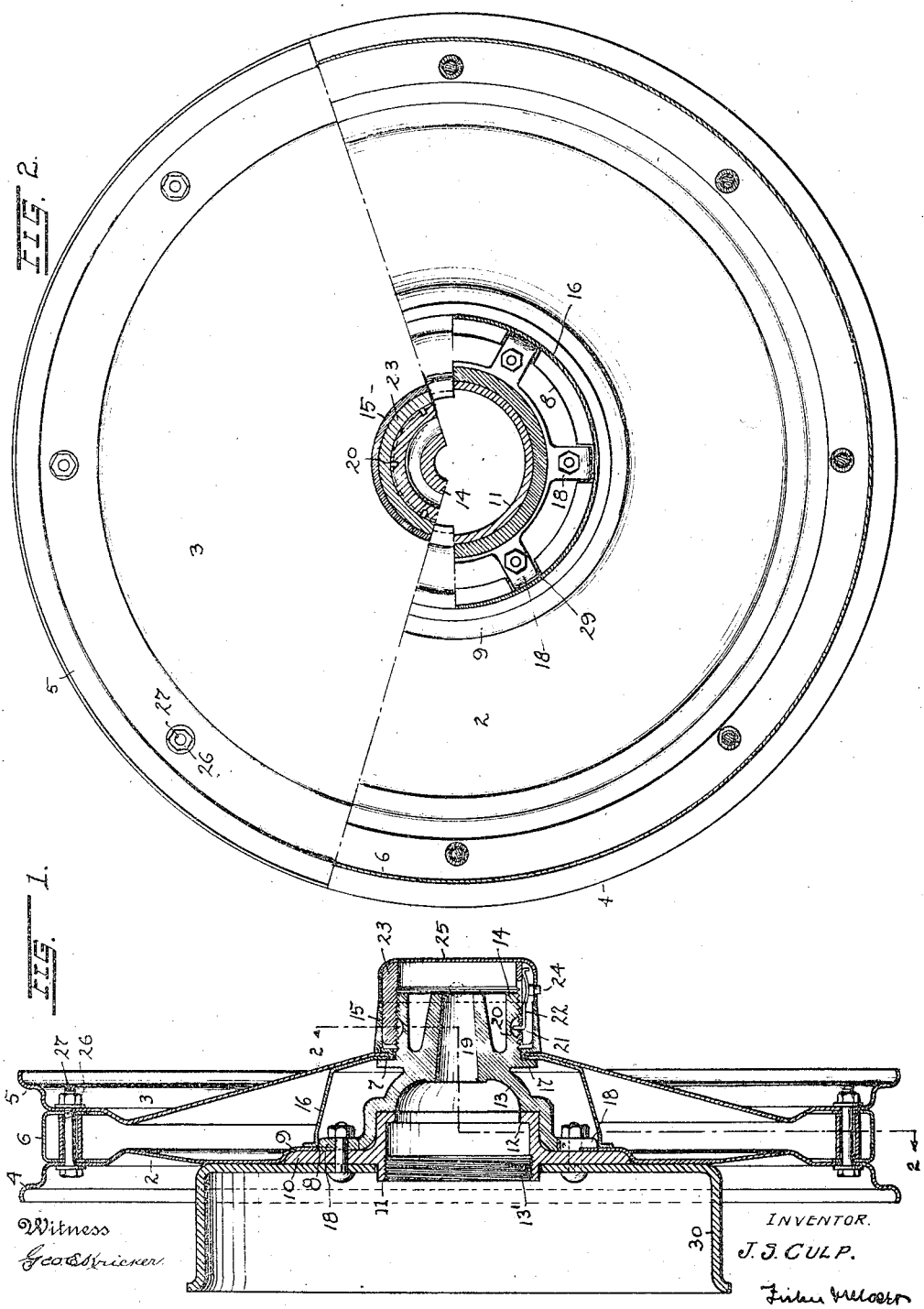

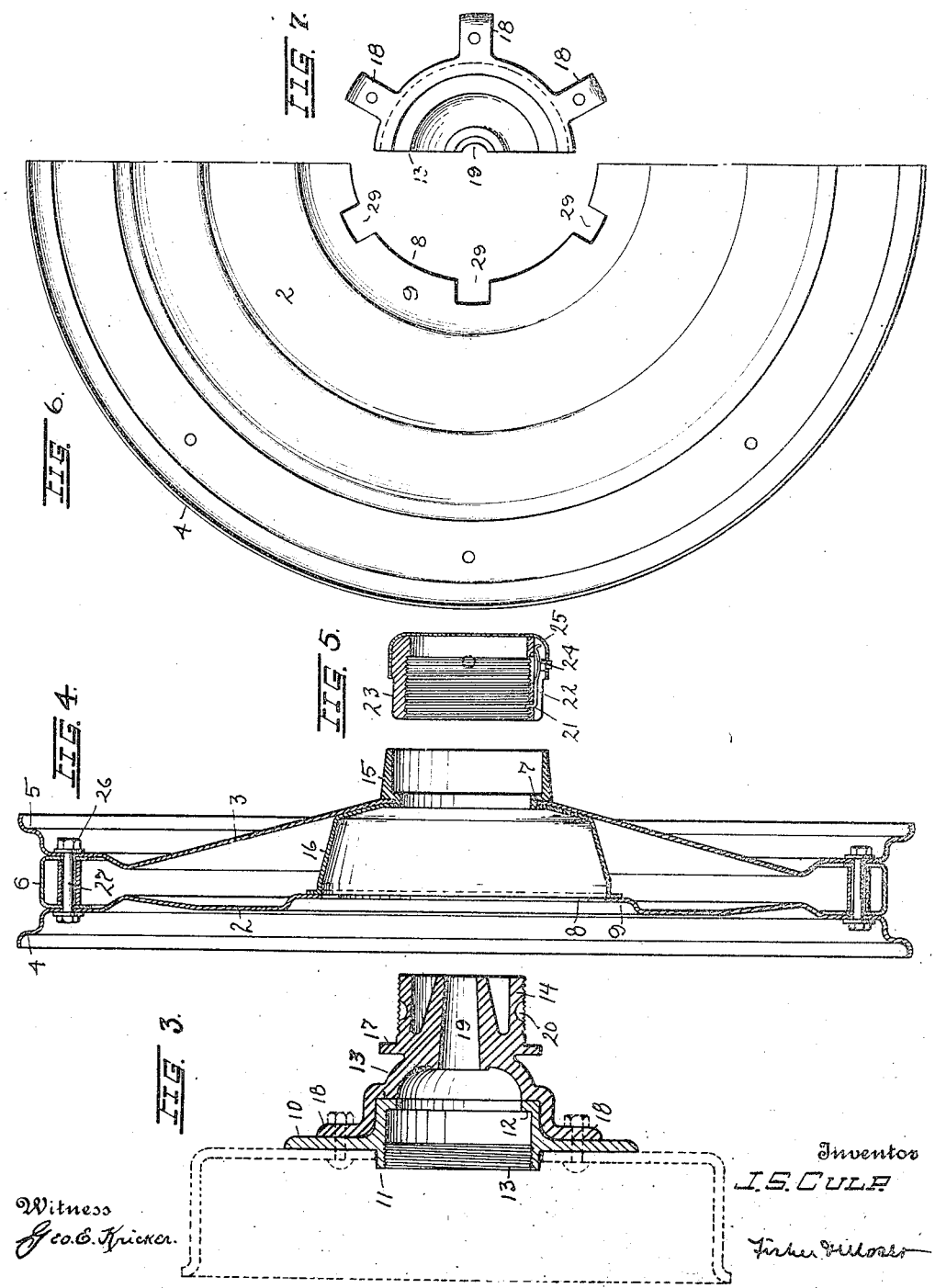

JAY STANLEY CULP, OF CLEVELAND, OHIO, ASSIGNOR, BY MESNE ASSIGNMENTS, TO THE RELIANCE WHEEL COMPANY, OF YOUNGSTOWN, OHIO, A CORPORATION OF OHIO.

PRESSED-STEEL VEHICLE-WHEEL.

1,320,534.　　　　　Specification of Letters Patent.　　Patented Nov. 4, 1919.

Application filed March 7, 1919. Serial No. 281,156.

*To all whom it may concern:*

Be it known that I, JAY STANLEY CULP, a citizen of the United States, residing at Cleveland, in the county of Cuyahoga and State of Ohio, have invented certain new and useful Improvements in Pressed-Steel Vehicle-Wheels, of which the following is a specification.

This invention relates to improvements in pressed steel vehicle wheels, and the object of the invention is to provide a relatively light and rigid construction of wheel adapted to be assembled and disassembled with relative ease and rapidity and economical to manufacture.

In the accompanying drawings, Figure 1 is a central section of the wheel parts assembled. Fig. 2 is a side elevation of the wheel. Fig. 3 is a sectional view of the hub and hub flange. Fig. 4 is a sectional view of the main body of the wheel removed from the hub. Fig. 5 is a sectional view of the hub cap. Fig. 6 is a rear view of one half of the slotted disk or plate, and Fig. 7 is a rear view of one-half of the hub, the hub flange being omitted.

The wheel comprises a main body built up of sectional parts stamped or pressed from sheet metal, together with a detachable hub member forged or cast from metal. A series of bolts and a removable hub cap secure the several parts together. Detailing the invention two side plates 2 and 3 are used which are of disk form and have corresponding outwardly-turned flanges 4 and 5, respectively, adapted to confine a tire upon a ring or rim member 6 when said plates are bolted together upon opposite sides of said member, and member 6 is preferably U-shape in cross section. The walls of the side plates are flat and parallel where engaged by the flanges of rim member 6 and thence extend toward each other on converging lines for a short distance and thence are projected on diverging lines toward the axis of the wheel, but from this point on the formation of the two disks or plates varies. Thus the outer disk 3 is formed like a truncated cone in its central portion to provide stiffness and rigidity to the wheel, and a central round opening 7 is also formed in said disk. The inner disk 2 has a relatively larger central opening 8 and an annular depression or seat 9 adapted to receive the annular flange 10 of a hub member 11, which as shown, comprises an inturned flange 12 at its outer end and internal screw-threads 13′ at its inner end. Member 11 serves to hold and secure a bearing cage or roller bearing elements therein not shown, and this member is bolted to or made a fixed part of a main hub 13 having an extension 14 adapted to project through opening 7 in outer disk 3. The edge portion of this opening is adapted to be clamped between a clamping ring 15 and the end wall of a cylindrical spacing and bracing shell 16 interposed between the two disks 2 and 3 and bearing against both. Thus the front end of shell 16 is clamped with disk 3 by ring 15 against an annular flange 17 on the hub extension 14, and the rear portion of the shell has a bent flange bearing against the depressed portion 9 opposite the hub flange 10. Hub 13 is enlarged and recessed where it is made to fit over hub member 11, and has radial lugs 18 at intervals with bolt holes in the lugs, and the disk 2 is slotted at intervals on radial lines in the edge of its opening 8 to receive the lugs. The hub extension 14 has a tapered central opening 19 adapted to fit over a tapered axle and it may be keyed or splined thereon. The axle is also usually provided with a nut which is screwed against a washer or the plain end face of the hub extension, but as this is old in practice it is not shown.

Hub extension 14 is screw-threaded and also channeled or provided with notches 20 at intervals which are adapted to receive the inwardly bent end 21 of a bowed locking wire 22 mounted within a hub cap member 23. This locking wire 22 is seated in a longitudinal channel in the side of cap member 23, and the head of a button or pin 24 engages the bowed portion of the wire, while the stem of this button or pin projects through an opening in a cover 25 for the cap member so that it may be engaged and pressed inward by a spanner wrench so as to spring the wire and withdraw its engaging end 21 from the notch, thereby permitting the screw cap member to be rotated by the spanner wrench and removed from the outer end of the hub. Removal of this part permits the clamping ring 15 and the outer plate 3 to be removed together, and the spacing shell 16 may also be withdrawn with the outer plate. If preferred, these three last named parts may be secured together in any suitable way or made separable.

To detach the outer plate 3 and spacing shell 16 from plate 2, it is first necessary to remove the nuts 26 from the bolts 27 which fasten the two plates to the flanges of the rim member 6. However, if these nuts are not released or removed, both side plates and the rim member comprising the main body of the wheel, may be slipped off of the hub together whenever the locking cap member 23 is removed. This is possible because the shell is interposed between and engaged with both disks and is in sleeved engagement with flange 17 of the hub and because the inner disk 2 is separable from lugs 18 of the hub and the flange 10, although adapted to be interlocked therewith so that they may rotate in common. As stated, this interlocking is effected by a series of slots 29 formed at intervals on radial lines at the inner edge of the central opening in disk 2 so as to receive the lugs 18 which extend radially outward from the enlarged part of the hub extension. The lugs have openings for bolts to clamp the two hub parts together, but these two parts may be cast in one piece for some types of wheels, and the same bolts may be used to clamp a brake drum 30 to flange 10.

What I claim is:

1. A pressed steel vehicle wheel comprising inner and outer disk-shaped side plates and a spacing shell and an annular rim interposed between the central and the rim portions, respectively, of said plates, in combination with a hub having a separable extension with a flange about the same and means to lock the outer of said plates and said shell against said flange, the said shell having a free bearing against the inner of said plates.

2. A pressed steel vehicle wheel comprising a flanged rim member and separate side plates of disk form clamped thereon, a shell constructed of sheet metal in bracing relations between the central portions of said plates, a hub having a flange about the same at its inner portion and a smaller flange about its middle portion, a bracing shell between the central portions of said side plates bearing against the larger of said flanges through the inner of said plates and means on said hub locking said shell and the outer of the said side plates against the smaller of said flanges.

3. In a pressed steel vehicle wheel, a hub having an annular flange about its base and radially disposed lugs rigid therewith at one side, an inner side plate having a depression bearing on the edge of said flange and lapping onto the side thereof and provided with radial slots adapted to interlock said plate with said lugs, an outer side plate sleeved over the outer portion of said hub, a spacing shell interposed between said side plates at their center, and a cap screwed onto said hub and a ring about said cap adapted to secure said parts in working relations.

4. A pressed steel vehicle wheel having inner and outer side plates and an annular rim member between the same, a hub and a central bracing shell interposed between said plates about the hub and having its larger inner portion bearing against the outer plate, the said hub having annular flanges engaged by said plates respectively and said shell spanning the space between said flanges and in bracing relations between said plates, between the hub and the rim of the wheel.

5. A pressed steel vehicle wheel comprising separate disk-shaped side plates and a U-shaped rim member clamped between the same, a hub having annular flanges and a sheet metal shell disposed centrally about the hub and apart from the body thereof in bracing relations between said plates and interlocked with the flanges on the hub and the said plates respectively, and means to clamp said several parts in working position.

Signed at Cleveland, in the county of Cuyahoga and State of Ohio, this 26th day of February, 1919.

JAY STANLY CULP.